United States Patent
Gemma, Jr.

(10) Patent No.: US 6,796,061 B2
(45) Date of Patent: Sep. 28, 2004

(54) BOOK WITH DISPLAY-CHANGING DEVICE

(75) Inventor: Edward A. Gemma, Jr., Milford, CT (US)

(73) Assignee: Innovative USA, Inc., Norwalk, CT (US)

( * ) Notice: Subject to any disclaimer, the term of this patent is extended or adjusted under 35 U.S.C. 154(b) by 0 days.

(21) Appl. No.: 10/145,424

(22) Filed: May 14, 2002

(65) Prior Publication Data

US 2003/0213151 A1 Nov. 20, 2003

(51) Int. Cl.[7] ................................................ G09F 11/00
(52) U.S. Cl. ........................ 40/491; 446/147; 446/151
(58) Field of Search .................. 40/491, 488; 446/147, 446/149, 151, 148, 150; 281/51, 27.2, 15.1

(56) References Cited

U.S. PATENT DOCUMENTS

| | | |
|---|---|---|
| 1,975,446 A | 10/1934 | Cahn |
| 2,145,794 A | 1/1939 | Huber |
| 3,946,508 A | 3/1976 | Booras |
| 4,519,629 A * | 5/1985 | Podosek .................... 281/27.2 |
| 4,537,576 A * | 8/1985 | Thorsheim et al. ......... 446/147 |
| 4,586,279 A | 5/1986 | Hopkins |
| 4,832,605 A | 5/1989 | Bragin |
| 5,029,902 A | 7/1991 | Komori |
| 5,460,414 A * | 10/1995 | Sargis ......................... 281/51 |
| 5,476,336 A * | 12/1995 | Osiecki et al. ................ 281/51 |
| 5,524,932 A | 6/1996 | Kalisher |
| 5,599,048 A | 2/1997 | Schoiler |
| 5,778,578 A | 7/1998 | Drapcho et al. |
| 5,788,286 A | 8/1998 | Hunt |
| 5,820,383 A | 10/1998 | Levins |
| 5,915,729 A | 6/1999 | Vap |
| 5,988,684 A * | 11/1999 | Blaustein et al. ............. 281/51 |
| 6,057,501 A | 5/2000 | Hale |
| 6,220,708 B1 | 4/2001 | Koest |

* cited by examiner

Primary Examiner—Gary C. Hoge
(74) Attorney, Agent, or Firm—Hedman & Costigan, P.C.; Alan B. Clement

(57) ABSTRACT

A book having at least one fold out page with a display-changing device that allows the user to vary and experiment with the words, pictures or colors associated with the text, representations, characters, objects or scenes depicted in the book.

12 Claims, 8 Drawing Sheets

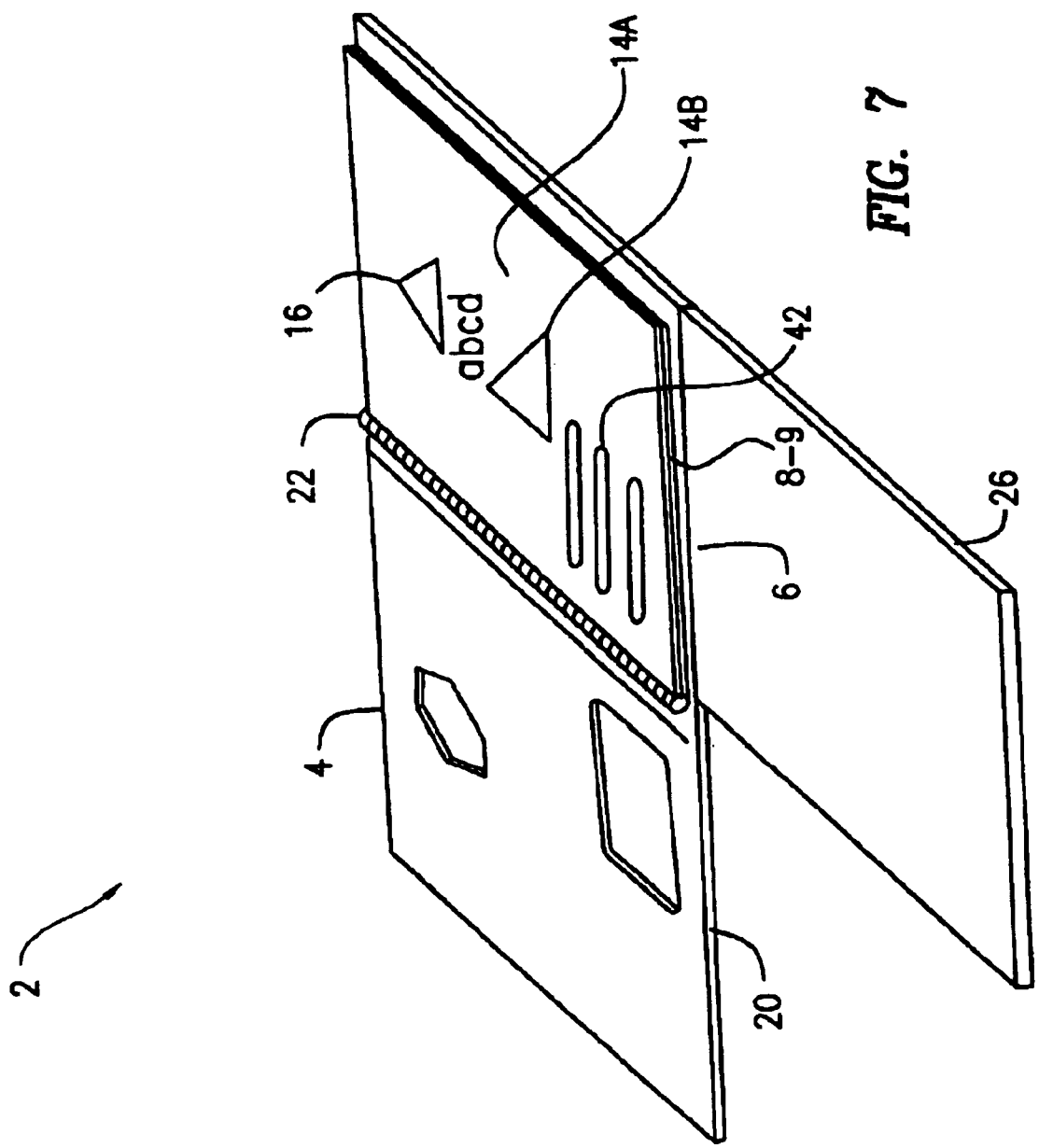

BOOK WITH DISPLAY-CHANGING DEVICE

FIELD OF INVENTION

The present invention relates to a book with a display-changing device. More particularly, the present invention relates to a book that is useful in stimulating a child's imagination and/or desire to read and learn. Most particularly, the present invention is related to a book with a display-changing device that allows the user to vary and experiment with the words, pictures and/or colors associated with the text, representations, characters, objects or scenes depicted in a book.

BACKGROUND OF INVENTION

Devices for stimulating a child's imagination and/or desire to read and learn are well-known in the art. Books are especially useful in this regard. The market for children's books is highly competitive. Publishers are constantly developing features for books that they believe children will find appealing. Further, books intended for young children are often designed to be educational and useful in teaching children elementary concepts such as colors, shapes, counting, the alphabet and so on.

Books of the aforementioned types take many forms. For instance, Levins, U.S. Pat. No. 5,820,383, teaches books that have magnetic manipulative pieces that may be placed on a page or adjacent a page to complete a picture. Hunt, U.S. Pat. No. 5,788,286, teaches a children's book enhanced with holograms that may be configured to compliment and/or correspond to graphics or text of the book. Schioler, U.S. Pat. No. 5,599,048, teaches a luminescent book of a type for educating and entertaining children. Kalisher, U.S. Pat. No. 5,524,932, teaches a method of making a personalized children's book by adhering transparent stickers with personalized text therein to textually blank page areas.

No prior art, however, teaches or suggests a book with a display-changing device that allows a user to vary the words, pictures and/or colors associated with the text, representations, characters, objects or scenes depicted in the book. Further, no prior art, teaches or suggests a book with a display-changing device that allows a user to experiment with mixing primary and secondary colors and/or creating other colors. In these ways, the present invention is a useful tool for teaching young children basic concepts and also stimulates a child's imagination and/or desire to read and learn.

SUMMARY OF INVENTION

The present invention concerns a device that stimulates a child's imagination and/or desire to read and learn.

Thus, it is an object of the present invention to provide a useful device that will enable the user to vary and experiment with the words, pictures and/or colors associated with representations, characters, objects or scenes depicted in a book.

Further, it is an object of the present invention to provide a useful device that will allow a user to experiment with mixing primary and secondary colors and create other colors.

It is a further object of this invention to allow a user to develop and/or express his/her imagination, creativity, and thinking skills.

It is a further object of this invention to provide an outlet for such creative entertainment that is easy to use and relatively cost-efficient to manufacture.

These and other objectives will become evident to those skilled in the art from the specification. To these ends, the book of the present invention comprises a front cover; a back cover; at least one page between the front and back covers; wherein the front cover, back cover and at least one page are bound together; wherein at least one of the front cover, back cover or page are provided with a display-changing device.

In certain preferred embodiments, the display-changing device is provided on a fold out page attached to the back cover by a gate fold and allows the user to change the words, pictures and/or colors associated with the text, representations, characters, objects or scenes depicted on other pages of the book and/or the front cover.

BRIEF DESCRIPTION OF THE INVENTION

FIG. 7 depicts an embodiment of the present invention wherein the display-changing device is attached to the bottom of the back cover of the book.

DETAILED DESCRIPTION OF THE INVENTION

The following description of preferred embodiments is presented to illustrate the present invention and is not to be construed to limit the scope of the appended claims in any manner whatsoever.

Figure 1:
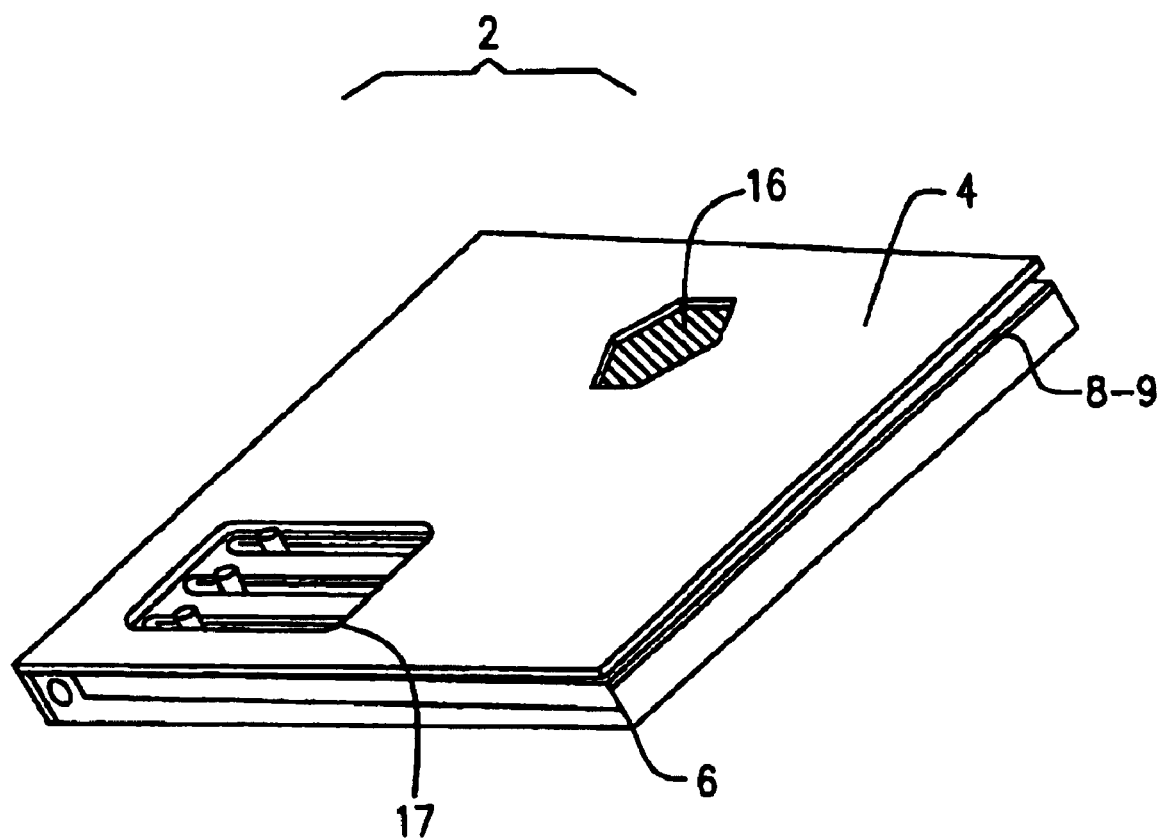
FIG. 1 depicts a top view of an embodiment of the present invention.

Referring to FIG. 1, there is shown a top view of an embodiment of the present invention. The book 2 has a front cover 4 bound to a back cover 6. The front cover 4 and back cover 6 may be constructed of any material known to those skilled in the art that provides sufficient rigidity and printability. These materials may include, but are not limited to, paper, cardboard, textiles and plastics. Preferred is cardboard that is about 1/16 of an inch thick. In the depicted embodiment, the front cover has a die-cut representation 16 and die-cut slots 17 that allow the user to manipulate and view the display-changing device (not shown). The operation of the book and display-changing device are further explained below with reference to FIG. 3 and FIG. 5.

Figure 2:
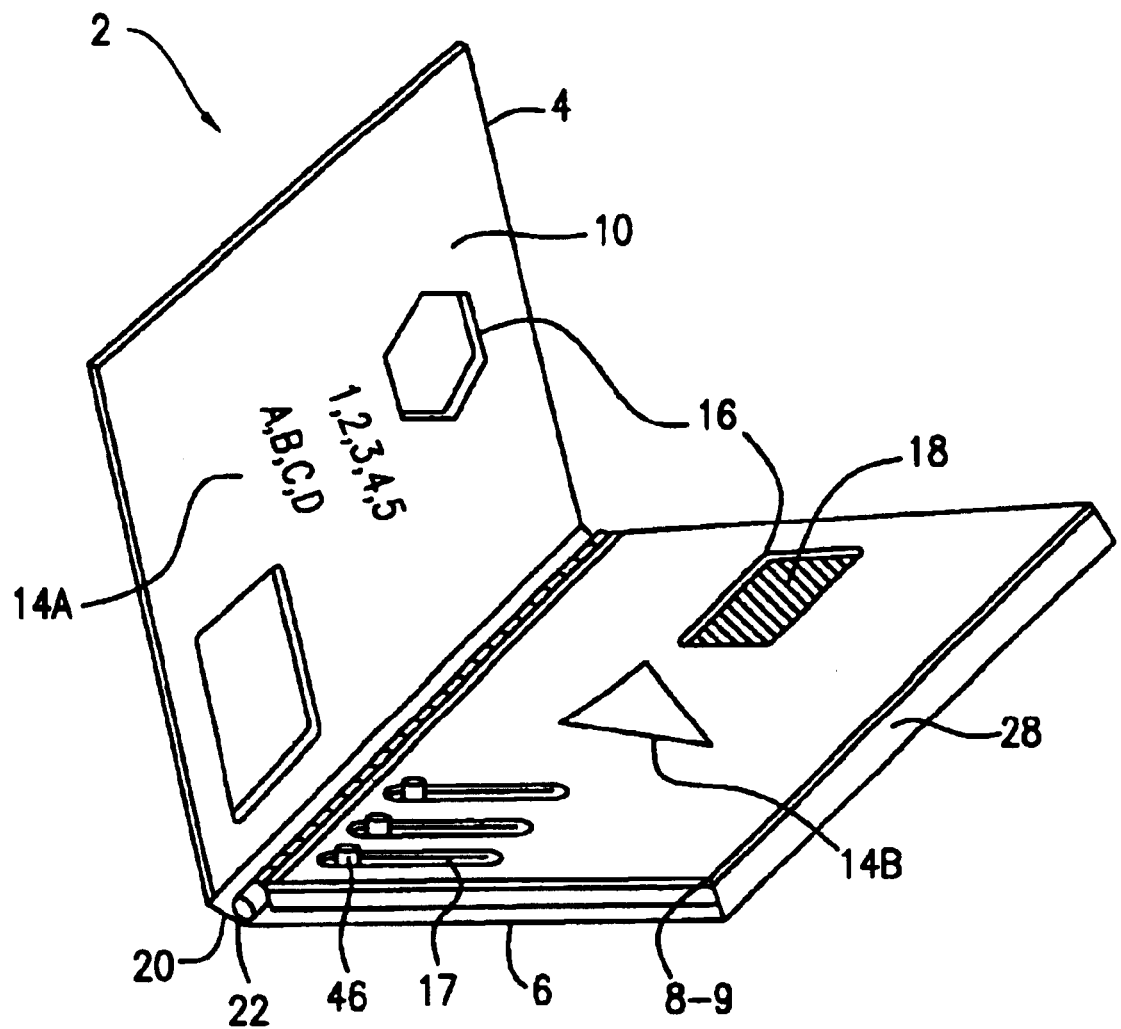
FIG. 2 depicts an embodiment of the present invention in an open position.

Referring to FIG. 2, an opened book 2 can be seen having a front cover 4, a back cover 6 and at least one page 8. Opposing pages show that text 14A may be located on the left hand page 10 (in this case, the inside of the front cover of the book) and other representations 14B on page 8 that relate to a die-cut representation 16 on the right hand page. However, in other embodiments, the text 14A and representation 14B may be on the right hand or left hand page or on both pages. The die-cut representation 16 covers the viewing window 18 of the display-changing device. The die-cut representation 16 can vary from relatively simple to very difficult. The drawing in FIG. 2 is a relatively simple square shape. The book may comprise a series of animal or other die-cut representations on the individual pages. The pages 8–9 are constructed of any paper that is normally employed in books. The page 8 is also provided with three slots 17 (although any number of slots may be employed in accordance with the present invention). Knobs 46, operatively connecting to the display-changing device and viewing window 18 are provided in slots 17 for movement slidably therein.

Figure 3:
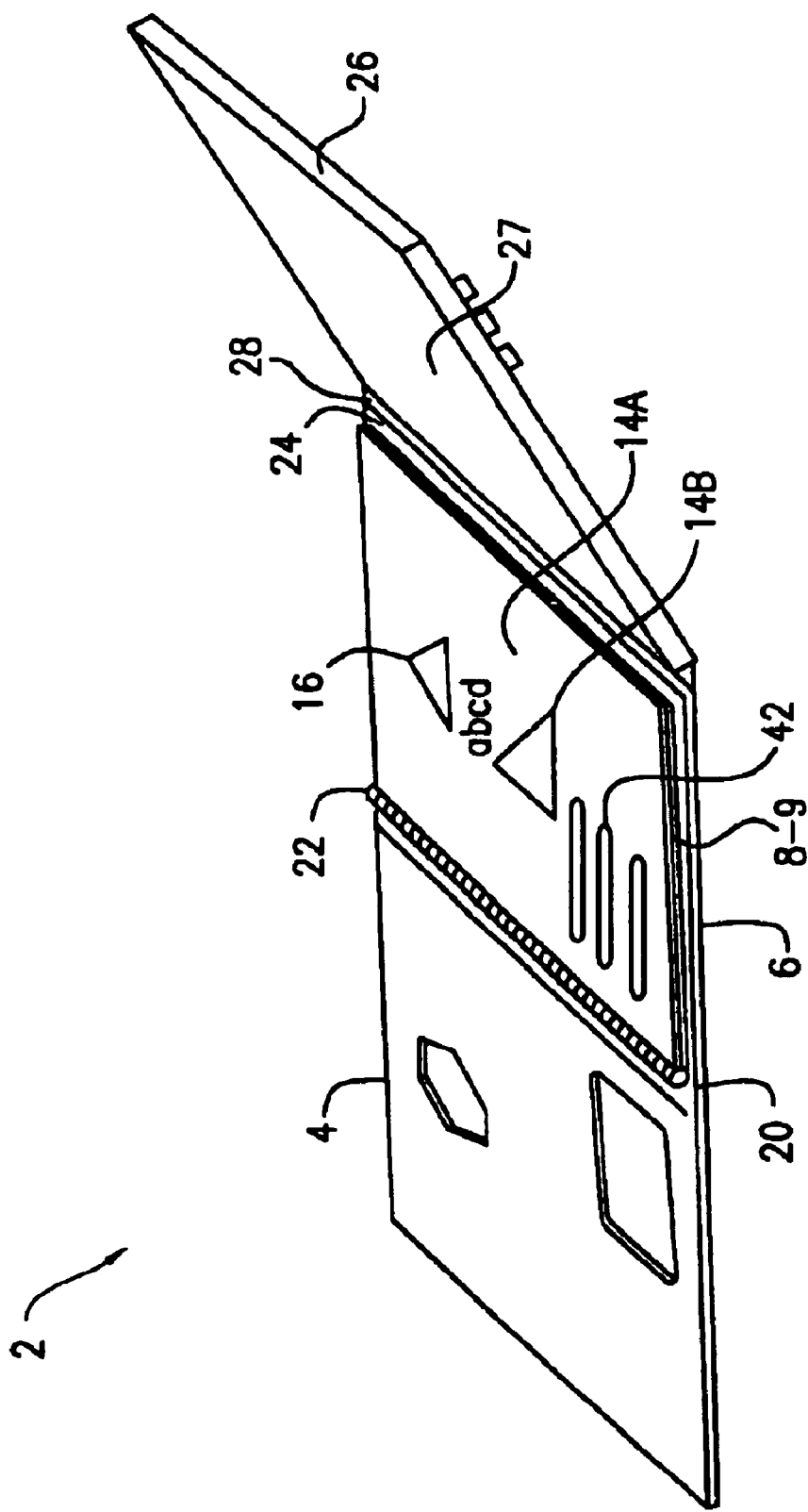
FIG. 3 depicts an embodiment of the inside of the back cover of the present invention.

Referring now to FIG. 3, there is shown a book of the present invention 2 having a front cover 4 and a back cover 6 that are bound by binding means 20 or may be one continuous folded piece. FIG. 3 also shows a plurality of pages bound by a spiral binding 22. The spiral binding for the pages 8–9 may be affixed to the front cover 4 and/or back cover 6 by any means known to those of ordinary skill in the art. Attached to the right hand side of back cover 24 is a fold out 27 comprising the display-changing device 26. The fold out 27 is attached to back cover 6 by a gate fold 28 for facilitating ease of use of the display-changing device. Other means for attachment are also contemplated as within the scope of the claims.

In the preferred embodiment of FIG. 3, the display-changing device 26 is attached at the underside of the fold out 27 by an adhesive, although other configurations of attachment are within the contemplated scope of the present invention.

Figure 4:
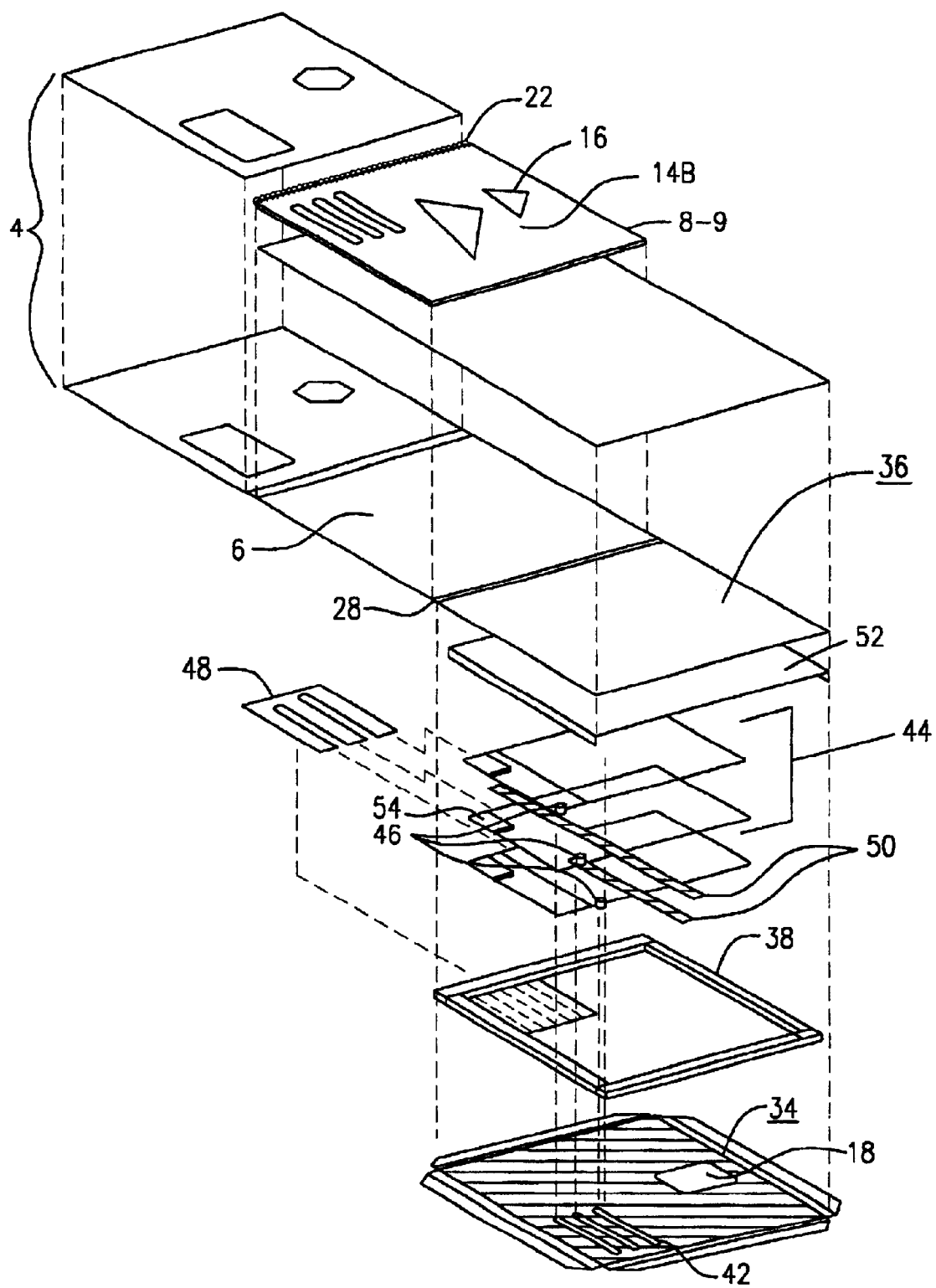
FIG. 4 depicts an exploded view of an embodiment of the display-changing device useful in the practice of the present invention.

Referring now to FIG. 4 the display-changing device 26 is comprised of a front panel 34; a back panel 36; a viewing window 18 formed in front panel 34; at least one sliding panel 44 between front panel 34 and back panel 36; a means for moving 46 the sliding panel 44 under said viewing window 18; whereby parts of the sliding panel 44 are successively exposed through the viewing window 18 and slots 42 as the sliding panel is moved under said viewing window 18.

In the depicted embodiment, the front panel 34, back panel 36 and spacer frame 38 are preferably comprised of a cardboard or other rigid material similar to that used for the front cover 4. The spacer frame 38 separates the front panel 34 and back panel 36 to allow for ease of movement of the sliding panel 44. The spacer frame 38 is preferably secured in position by gluing the edges thereof to the edges of the panels or by any other means known to those of ordinary skill in the art.

The front panel 34 has a viewing window 18 and finger guide slots 42 die-cut therein. The sliding panels 44 are housed in the compartment formed by the spacer frame 38. In one preferred embodiment, the sliding panels 44 are three (3) color-tinted clear sheets (yellow, red and blue) that, when slid to a certain position via finger knobs 46 that protrude from the sheets through the finger guide slots 42, reveal a color in the viewing window 18. These color-tinted clear sheets can be slid over one another to create combinations of colors. For instance, yellow and blue tinted clear sheets can be positioned to create a green color visible in the viewing window 18. In other embodiments, the successive parts of each of the tinted sheets may be printed in gradations of one color from 0 percent to 100% whereby the user may increase or decrease the color exposed in said viewing window by sliding the sliding panel under the viewing window.

In other preferred embodiments, the sliding panels may comprise printed matter such as words or pictures that, when slid to a certain position via the finger knobs 46 or other means for moving the sliding panels 44 under the viewing window 18, reveal different word(s) or picture(s) in the viewing window 18. In other embodiments, the means for moving the sliding panels 44 under the viewing window 18 may be tabs or turning knobs or any other means known to those skilled in the art.

Further, in the depicted embodiment, a finger guide 48 may be affixed between the front panel 34 and back panel 36. The fingers of the finger guide fit within a channel 54 in the lower portion of the sliding panels 44 and serve keep to the sliding panels on a track when they are slid by the user via the knobs 46.

In the depicted embodiment, a buffer panel 52 provides a buffer between the unfinished surface of the inside of the back panel 36 and the sliding panels 44 and may reduce static. In one preferred embodiment, this buffer panel 52 is constructed of cardboard coated with press varnish and is about 0.015 to about 0.020 inches in thickness. However, the buffer panel may be of any suitable thickness, and/or made of any other suitable material, known to those skilled in the art. Also depicted are panel separating strips 50. Panel separating strips 50 may be placed between the sliding panels 44 to reduce the friction between them and make them easier to slide. In one preferred embodiment, the panel separating strips 50 are constructed of art paper of about 0.004 inches in thickness. However, the strips 50 may be of any suitable thickness, and/or made of any other suitable material, known to those skilled in the art.

Figure 4A:
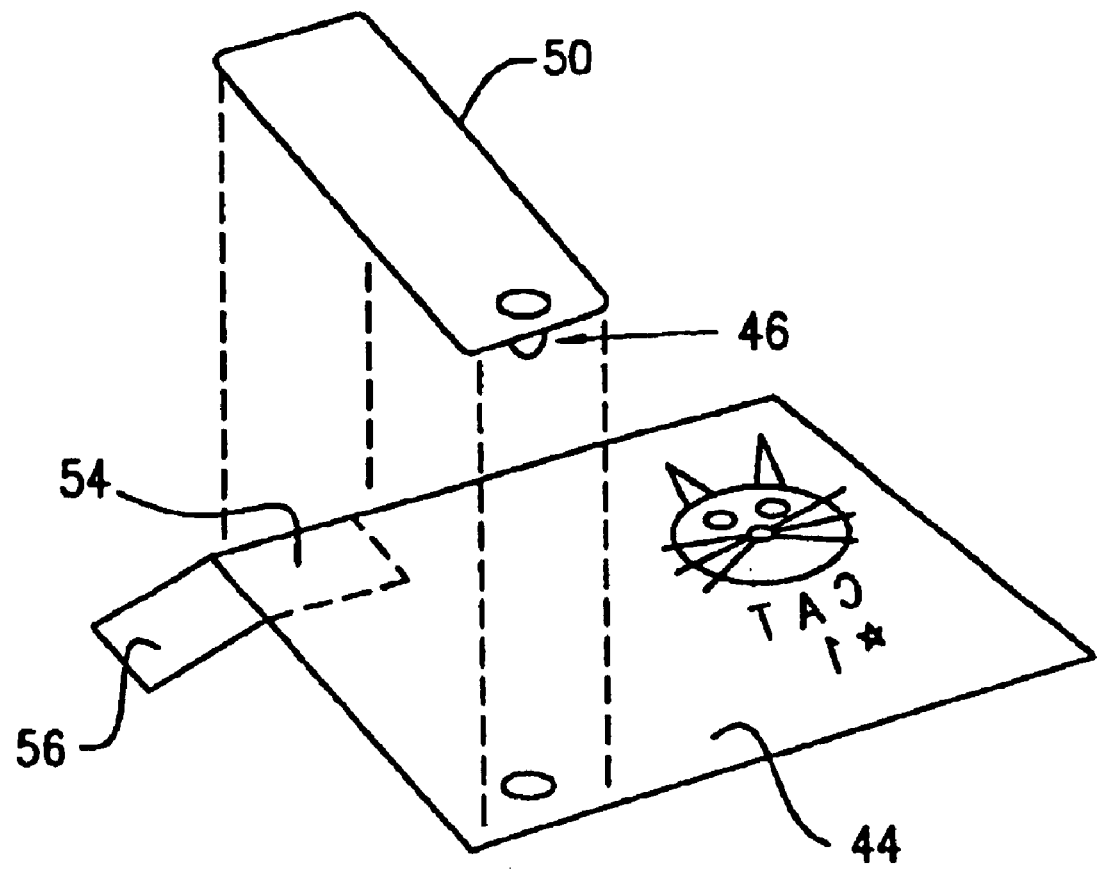
FIG. 4A depicts one embodiment of a sliding panel useful in an embodiment of a display-changing device of the present invention.

FIG. 4A depicts an example of a sliding panel 44 useful in the present invention. Protruding from the sliding panel 44 is a tab 56 that may be folded under the panel so that the topmost edge of the tab may be affixed to the surface of the panel to form a channel 54 that engages with the fingers of the finger guide 48 (not shown). Also depicted is the knob 46. In this embodiment, the knob 46 is of unitary construction with a strip 50 that is affixed to the sliding panel 44. The strip 50 serves to give ridgity to the sliding panel for ease of operation. The strip 50 may be made of cardboard or plastic. In other preferred embodiments, the strip 50 need not be of unitary construction with the knob 46.

Figure 5:
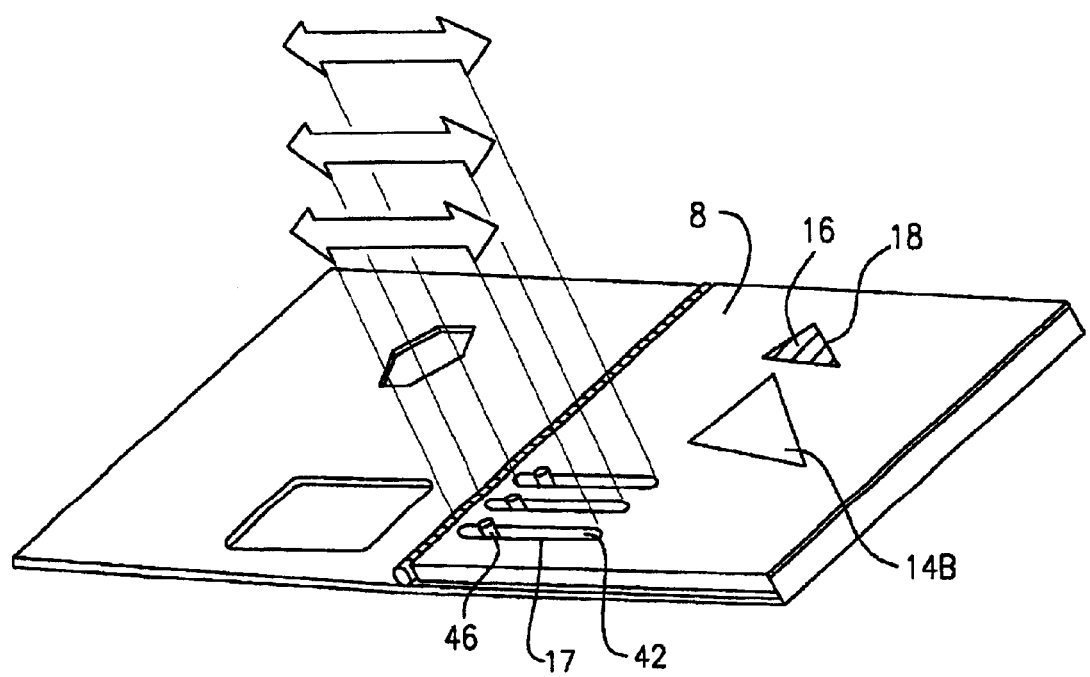
FIG. 5 depicts an embodiment of the present invention with the display-changing device folded under a page of a book.

In order to operate the book, reference is had first to FIG. 3. The book 2 is opened to the back cover 6 and the display-changing device 26 is extended out in the manner shown in FIG. 3. The pages 8–9 are then turned downward toward the back cover 6, and the display-changing device 26 is then folded in under the page that is desired to be used as shown in FIG. 5. Die-cut holes 16 and slots 17 in the page now align with the viewing window 18 and slots 42 on the display-changing device, respectively. Different word(s), picture(s) or color(s) (or combinations thereof) can be viewed through the die-cut hole 16 and appear to blend into the text 14A or graphics 14B on the page. Changes in text or color can be controlled while the page is over the gate fold 28 by finger knobs 46 that protrude though die-cut slots in the page 17 from the display-changing device or other means for moving the sliding panel(s). In this manner, the book allows a user to change the words, pictures and/or color(s) of what appears to be part of the printed page.

The slots 17 and viewing window 18 can be located anywhere on the page 8 as long as they cooperate with display-changing device 26. Additionally there can be more than one viewing window 18. In this manner, the viewing windows 18 and changing displays in the window manipulated by moving the sliding means 46 in the slots 17 can be configured to cooperate with the text of the book 14A and/or representations 14B in a variety of ways.

It is noted here that the gate fold 28 is constructed to be of a size suitable to provide sufficient clearance for the display-changing device 26 to easily fit under any of the pages of the book.

Figure 6:
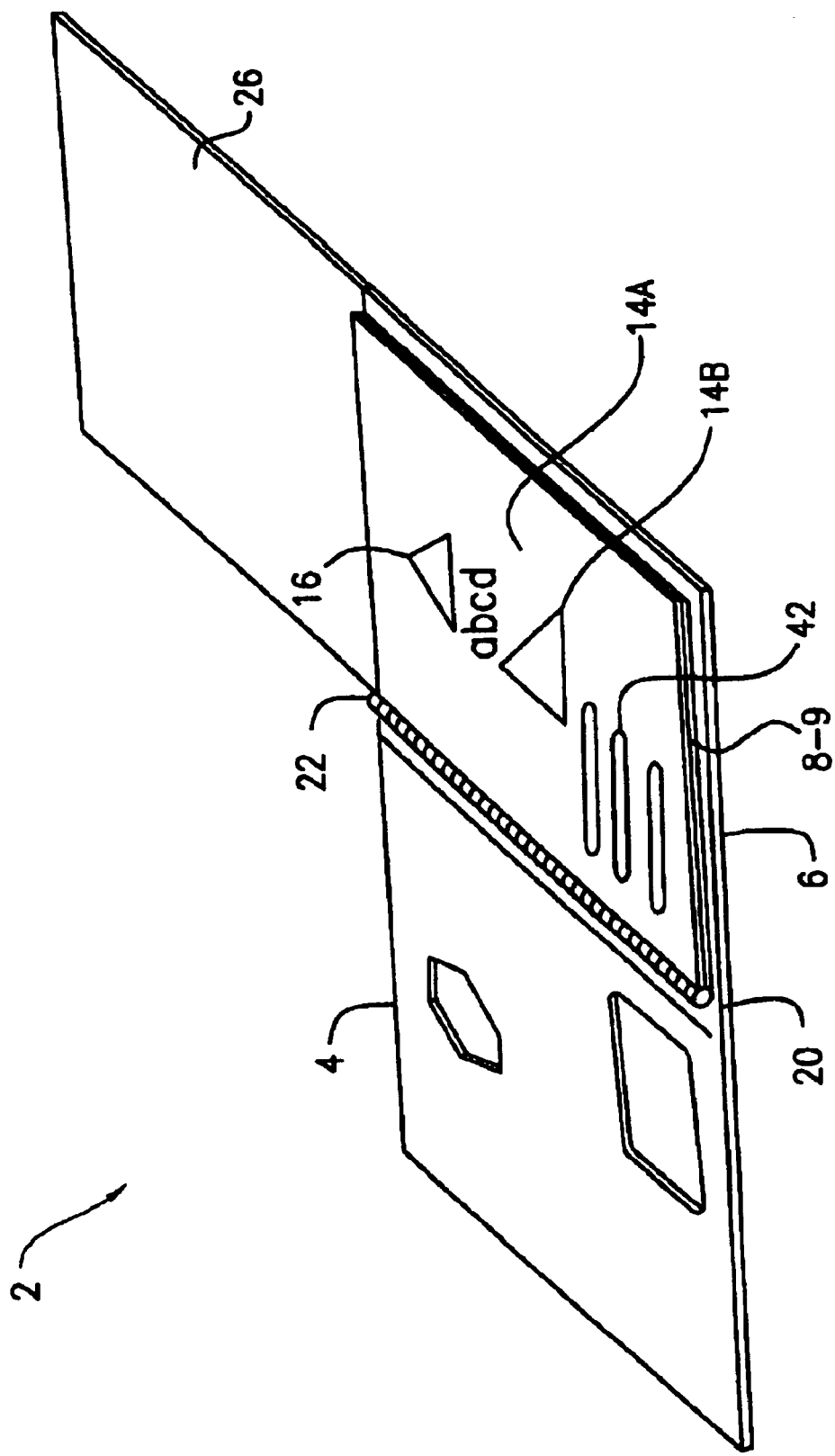
FIG. 6 depicts an embodiment of the present invention wherein the display-changing device is attached to the top of the back cover of the book.

Many variations of the present invention will suggest themselves to those skilled in the art in light of the above-detailed description. For example, instead of attaching the display-changing device to the right side of the back cover, the display-changing device may be attached to the top or bottom of the back cover. Such embodiments are depicted in FIG. 6 and FIG. 7 respectively. Also, any number of slots and/or viewing windows or display changing devices can be employed in the practice of the present invention. Preferred are from 1 to 5 slots (with from 1 to 5 corresponding sliding panels), from 1 to 5 viewing windows, and from 1 to 5 display-changing devices. All such obvious modifications are within the full-intended scope of the claims.

I claim:

1. A book comprising:

a front cover;

a back cover;

at least one page between said front and back covers;

said front cover, back cover and at least one page being bound together; and wherein at least one of said front cover, said back cover or said page are provided with at least one display-changing device comprising at least one sliding panel;

wherein said front cover, said back cover or said page are provided with a means for allowing access to a means for manipulating said display-changing device; and wherein the display-changing device is attached to any of said front cover, said back cover or said page by means of a fold out.

2. A book as defined in claim 1 wherein said display-changing device is attached to the back cover by means of a fold out.

3. A book as defined in claim 2 wherein said fold out is connected to the back cover on the right hand side of the back cover.

4. A book as defined in claim 2 wherein said fold out is connected to the back cover on the topside of the back cover.

5. A book as defined in claim 2 wherein said fold out is connected to the back cover on the bottom side of the back cover.

6. A book comprising:

a front cover;

a back cover;

at least one page between said front and back covers;

said front cover, back cover and at least one page being bound together; and wherein at least one of said front cover, said back cover or said page are provided with at least one display-changing device; and wherein said front cover, said back cover or said page are provided with a means for allowing access to a means for manipulating said display-changing device wherein said display changing device further comprises a viewing window and wherein said means for manipulating the display-changing device are finger knobs that cooperate with slots in the front cover and/or pages of the book and whereby said manipulation allows the user to change the display in the viewing window of the display-changing device.

7. A book comprising:

a front cover;

a back cover;

at least one page between said front and back covers;

said front cover, back cover and at least one page being bound together; and wherein at least one of said front cover, said back cover or said page are provided with at least one display-changing device; and wherein said front cover, said back cover or said page are provided with a means for allowing access to a means for manipulating said display-changing device wherein said display-changing device comprises:

a front panel;

a back panel comprising a viewing window;

at least one sliding panel between said front panel and back panel;

a means for moving the sliding panels under said viewing window;

whereby parts of said sliding panel are successively exposed as said sliding panel is moved under said viewing window.

8. A book as defined in claim 7 wherein each said sliding panel is color-tinted a different color and whereby said movement allows different combinations or mixtures of colors to be visible through said viewing window.

9. A book as defined in claim 8 wherein there are three sliding panels wherein one sliding panel is color-tinted yellow; one sliding panel is color-tinted red; and one sliding panel is color-tinted blue.

10. A book as defined in claim 8 wherein successive parts of each of the sliding panels are color-tinted and whereby the parts of each sliding panel that are successively exposed under said viewing window may increase or decrease in color valuation as said sliding panel is moved under the viewing window.

11. A book as defined in claim 7 wherein said means for moving said sliding panels are slots in said front panel and/or back panel comprise guide finger knobs that are attached to said sliding panels.

12. A book as defined in claim 7 wherein said sliding panels bear printed markings whereby said movement of said sliding panels under the viewing window allows different words, pictures, numbers, symbols or combinations thereof to be visible through said viewing window.

* * * * *